United States Patent [19]

Persson

[11] Patent Number: 4,669,649

[45] Date of Patent: Jun. 2, 1987

[54] JOINT BETWEEN TWO PREFERABLY METALLIC PIPES AND METHOD OF PRODUCING SAID JOINT

[75] Inventor: Bengt Persson, Olofström, Sweden Olofström, both of Sweden

[73] Assignees: Nitro Nobel AB, Gyttorp; AB Volvo, Gothenburg, both of Sweden

[21] Appl. No.: 800,386

[22] Filed: Nov. 21, 1985

Related U.S. Application Data

[63] Continuation of Ser. No. 558,343, Dec. 5, 1983, abandoned.

[30] Foreign Application Priority Data

Dec. 3, 1982 [SE] Sweden .............................. 8206913-9

[51] Int. Cl.⁴ .............................................. B23K 20/08
[52] U.S. Cl. ..................................... 228/107; 228/2.5
[58] Field of Search ................. 228/2.5, 107, 108, 109, 228/173.2

[56] References Cited

U.S. PATENT DOCUMENTS

| 3,290,770 | 12/1966 | Silverman et al. | 228/107 X |
| 3,290,771 | 12/1966 | Silverman et al. | 228/107 X |
| 3,566,646 | 3/1971 | Walkup | 228/2.5 X |
| 3,761,004 | 9/1973 | Hanson et al. | 228/2.5 |
| 3,910,478 | 10/1975 | Howell et al. | 228/107 X |
| 4,026,583 | 5/1977 | Gottlieb | 228/107 X |
| 4,162,758 | 7/1979 | Mikarari | 228/173.2 |
| 4,228,941 | 10/1980 | Persson | 228/107 |
| 4,248,373 | 2/1981 | Linse et al. | 228/107 |

FOREIGN PATENT DOCUMENTS

| 766741 | 1/1957 | United Kingdom | 228/2.5 |
| 1394819 | 5/1975 | United Kingdom | 228/107 |
| 2106817 | 4/1983 | United Kingdom | 228/2.5 |

Primary Examiner—M. Jordan
Attorney, Agent, or Firm—Dennison, Meserole, Pollack & Scheiner

[57] ABSTRACT

Sealing and cracking problems occur when joining coarse-caliber pipes (1 and 2) for oil or gas, for instance, by means of welding. The problem is solved by using an outer peripheral part (3) and an inner peripheral part (4) at the joint, and applying the latter part (4) by means of explosive welding. At the same time, the outer peripheral part (3) forms a firm joint, due to the action of the explosive welding.

18 Claims, 9 Drawing Figures

JOINT BETWEEN TWO PREFERABLY METALLIC PIPES AND METHOD OF PRODUCING SAID JOINT

This is a continuation of co-pending application Ser. No. 558,343 filed on Dec. 5, 1983 now abandoned.

BACKGROUND OF THE INVENTION

The present invention relates to joining pipes. This can be achieved in many ways, one of which is welding, which is used particularly in the case of large-diameter pipes, such as pipe-lines for gas, oil or other industrial products. The pipes may even be for district heating systems. In such pipes the demands for tightness and strength are generally extremely high and accurate welding methods are therefore necessary. Such pipes often have to be welded in unfavourable weather conditions and out at building sites. Due to the high demands on the finished welds, the use of welding becomes expensive and time-consuming. Welding also requires skilled labour. A normal welding joint cannot prevent running cracks which can occur in pipe-lines. These cracks have a tendency to run along a pipe-line for several kilometers, even passing welded joints.

SUMMARY OF THE INVENTION

The object of the present invention is to produce a joint which fulfils high demands for tightness. The joint is formed by applying an outer peripheral part or support ring at the joint of joining, and an inner peripheral part or overlap ring at the point of joining. The overlap ring is provided with an explosive charge which is detonated in some way. When the charge is detonated, an explosive weld is obtained on the inner side of the point of joining, at the same time as the pipe ends at the joining point are deformed and bent outwards together with said outer peripheral part or support ring. An explosive weld is thus obtained internally around the point of joining, as well as a mechanical joint being formed externally due to deformation of the pipe ends and the outer peripheral part or support ring. A double joint is thus obtained by means of the new joint unit; a mechanical joint and an explosive joint. The mechanical joint provides reliable strength and tightness of the joint, the internal explosive weld also contributing to said tightness. Of the two sealing processes, the explosive weld is the most important, the mechanical seal being merely a consequence thereof.

Great accuracy is obtained thanks to the fact that both the outer peripheral part and the inner peripheral part with its explosive charge can be factory-made with great accuracy.

The explosive charge is also tubular in shape, and an initiating charge is arranged to initiate a detonator in known manner. The explosive charge is detonated simultaneously around its inner circumference. The detonation in the explosive charge continues in axial direction in both directions if the charge is detonated between its ends on the inner periphery.

The inner peripheral part or overlap ring is preferably triangular in cross section and the smallest distance to the inner surface of the pipe varies between 0 and 10 mm, depending on the thickness of the peripheral part. The thickness the peripheral part, the greater the distance may be to the inner surface of the joined pipes.

In order to avoid fringe effects in explosive welding, a detonation speed of between 3000 meter/second and 6000 meter/second is used, preferably between 4500 m/s and 5000 m/s.

The outer peripheral part may have thinner wall thickness between its ends. This can be achieved either by means of an outer circumferential groove or an inner circumferential groove. This results in a smoother external surface on the outer peripheral part.

The outer peripheral part may consist of thin material. In this case a rigid peripheral ring is applied to function as support ring and is removed after explosive welding. The support ring can preferably be split in order to facilitate removal.

Both the outer peripheral part and the inner peripheral part may be of different material, and of different material with respect to the pipes to be joined.

However, if the pipes to be joined consist of compound material it is advisable for the inner peripheral part to be of the same material as the inner surface of the two pipes to be joined.

It may be advisable to arrange aids between the outer peripheral part and the pipes to be joined, in order to achieve the best possible seal. These additional aids may comprse ridges or various inserts of different types of material.

If a weld is to be inspected ultrasonically, it is advisable to arrange a layer of material permitting ultrasound to pass through, between the two pipes to be joined and the outer peripheral part. Suitable materials are zinc or plastic.

The triangular cross-section of the inner peripheral part, mentioned earlier, should be such that the triangle section is equilateral and the sides incline between 3° and 20° in relation to the inner surface of the pipes to be joined. An increased angle reduces the speed of the collision front.

The tubular explosive charge mentioned may consist of dynamite, dynamex, trinitrotoluene, and may be mixed with inert material such as cardboard, woodfibre, wood meal, plastic dolomite or cooking salt. The detonation speed of the charge can be modified by the addition of inert material. The inert material may be added in the form of power or as a layer. The explosive charge may thus consist of several layers one on top of the other, the layers being alternately inert material and explosive, for instance.

The detonating charge may be in the form of a disc or a spoke system. In the latter case the explosive is limited.

Explosve charge, initiating charge and detonator shall be suitably encased. Plastic is a suitable material for this purpose, but other materials such as aluminium as also feasible.

It is even possible to produce a joint according to the present invention under water. This seals both the outer peripheral part and the inner peripheral part to the joint of joining, as well as the surfaces to be joined together mechanically by means of explosive welding. Sealed parts are completely free from water by a suction system.

Additional features of the present invention are revealed in the following claims.

The present invention will be described in more detail with reference to the accompanying six sheets of drawings, in which

DESCRIPTION OF THE PREFERRED EMBODIMENT

Figure 1:
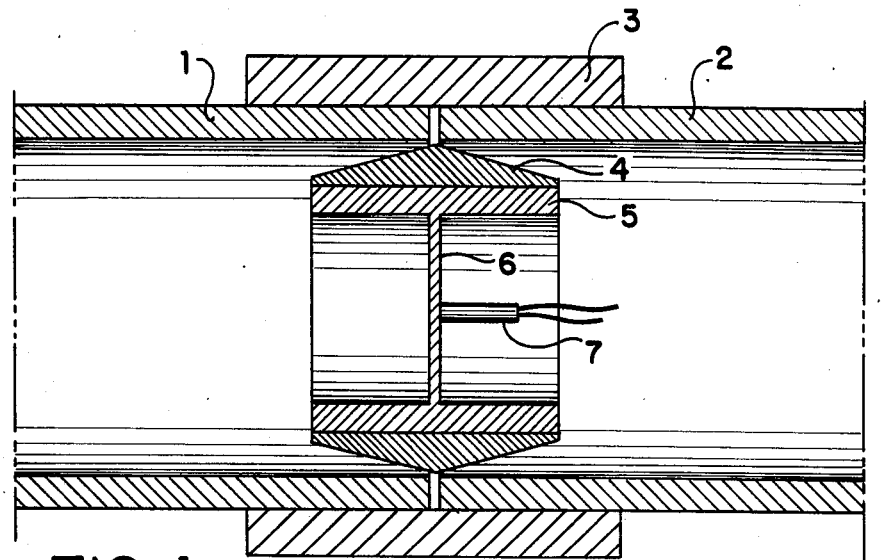
FIG. 1 shows a joint before detonation of an explosive charge.

FIG. 1 shows two pipes 1 and 2 to be joined. An outer peripheral part 3 is applied around the joining point. The peripheral part also acts as a support ring. On the inside of the joint an inner peripheral part or overlap ring 4 with a triangular cross-section is arranged. Of course, the inner peripheral part may have any other suitable cross-section, but it has been found that a triangular cross-section is to be preferred. The smallest distance between the peripheral part 4 and the inner surfaces of the pipes 1 and 2 may vary between 0 and 10 mm. Both the inner peripheral part 4 and the outer peripheral part 3 are preferably of the same type of material as the two pipes 1 and 2. Other materials are of course also possible. However, if pipes 1 and 2 are compound pipes, it is recommended that the material in the inner peripheral part is of the same type as that forming the inner layer of the pipes. The inside of the inner peripheral part is provided with a tubular layer of explosive material. The layer is designated 5 and consists of an explosive charge such as dynamite, dynamex, trinitrotoluene, etc. A disc 6 is placed in the hollow of the tubular explosive charge 5, equidistant from the ends of the charge. The disc 6 consists of an initiating charge which may be pentyl, explosive paste or some other equivalent explosive. In the centre of the disc is a detonator 7 which may be of any type. A detonation speed higher than that normally used for explosive welding is chosen for the explosive charge. The most suitable speed is probably between 3000 m/s and 6000 m/s, most preferably between 4500 m/s and 5000 m/s.

If the explosive charge is now detonated by the detonator 7 via the iniating charge 6, the detonation in charge 5 will move axially in both directions in relation to the initiating charge 6. The velocity of the collision front and the impulse of the explosive charge are fully satisfactory in relation to the detonation speed selected, to obtain a perfectly satisfactory weld between the inner peripheral part 4 and the inner surfaces of the pipes 1 and 2. Had a lower detonation speed been selected, the risk of fringe effects in the form of lack cohesion near the edges of the inner peripheral part would have been considerable. This is unacceptable from the point of view of corrosion in the gaps. The weld obtained by means of explosive welding has the appearance shown in FIG. 2. This reveals that the inner surface of the joint is uniform and aligned with the inner srfaces of the two pipes 1 and 2. The explosive welding causes the end surfaces of the two pipes 1 and 2 to be bent up, taking with them the central part of peripheral part 3, which thus becomes curved. The curved, outer peripheral part 3 is designated 3'. This curving of the outer peripheral part 3' and the bending up of the two pipe ends 1 and 2 gives an extremely strong joint, as well as satisfactory sealing. Should even more reliable sealing be required between the inner surface of the outer peripheral part and the outer surface of the pipes, various sealing layers may be applied or other mechanical measures be taken such as the provision of grooves or ridges.

Figure 2:
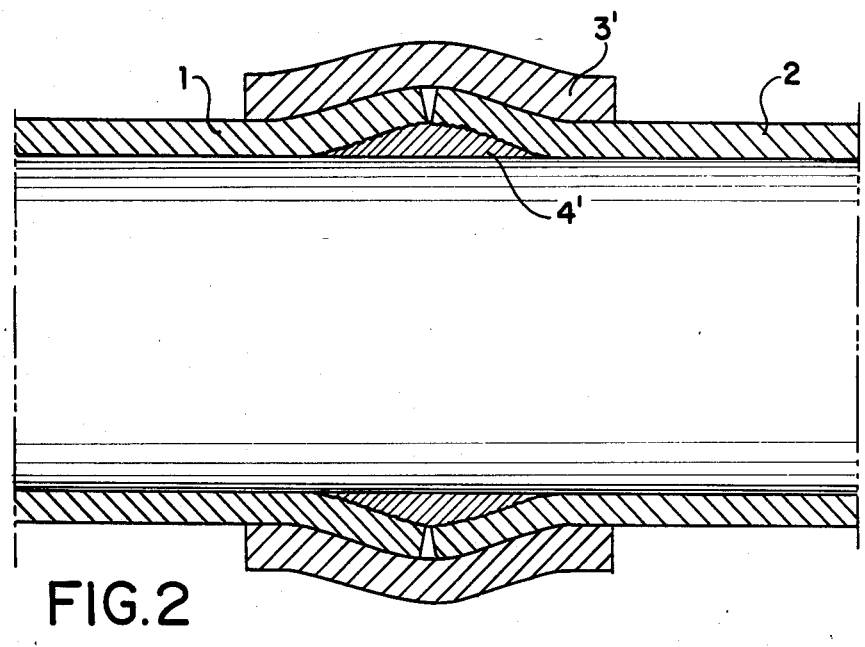
FIG. 2 shows the same joint as in FIG. 1, after detonation of the explosive charge.

The joint illustrated in FIGS. 1 and 2 achieves double sealing through the explosive weld and also through the deformed outer peripheral part 3' and deformed pipe ends.

To facilitate the joining procedure it is advisable to prefabricate both the outer peripheral part and the unit comprising inner peripheral part 4, explosive charge 5, initiating charge 6 and detonator 7. Prefabrication ensures high quality of the parts 3-7. The parts 3-7 may even be made as a unit and this is then extremely easy to apply on the end of one pipe, after which the other pipe end is applied. In this case, it is advisable to provide the outer peripheral part 3 and the inner peripheral part 4 with a connecting member in the form of a circumferential strip of a number of pins joining the two peripheral parts 3 and 4 together.

Figure 3:
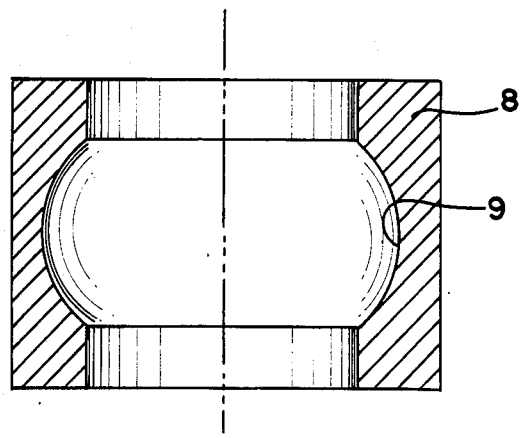
FIGS. 3, 4, 5 show embodiments of an outer peripheral part or support ring.
Figure 4:
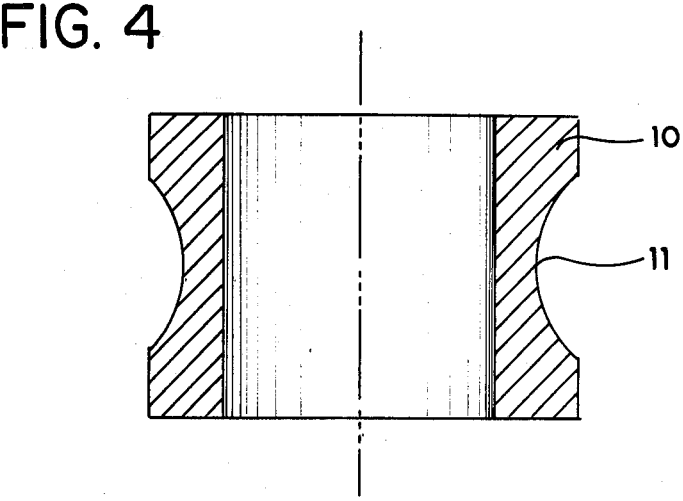

The outer peripheral part 3 may be designed differently. FIG. 3, for instance, shows a peripheral part 8 with reduced wall thickness in the form of an inner, concave circumferential groove and FIG. 4 shows an outer peripheral part with reduced wall thickness 11 caused by an outer concave circumferential groove. A more uniform external surface is obtained after explosive welding by using an outer peripheral part according to FIGS. 3 and 4.

Figure 5:
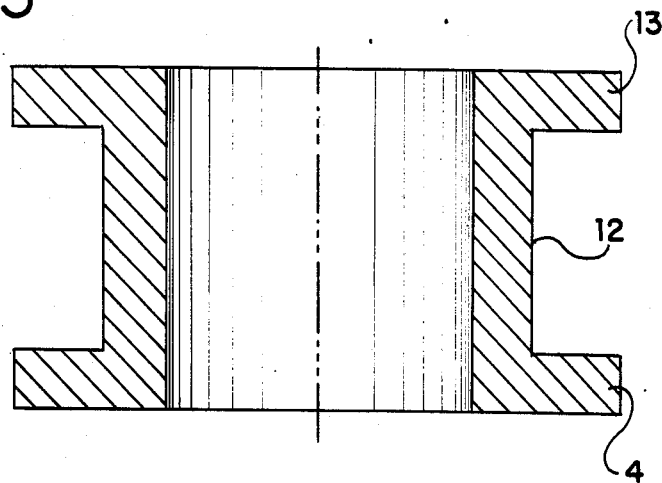
Figure 6:
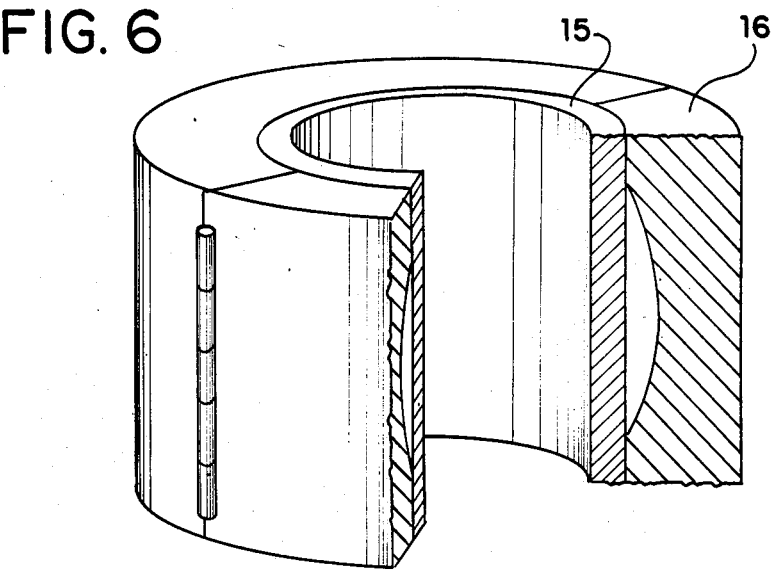
FIG. 6 shows a peripheral part of thinner material, cooperating with an outer tool acting as support ring.

FIG. 5 shows an embodiment of a peripheral part 12 provided at the ends with two outwardly directed flanges 13 and 14. This gives a stronger peripheral part.

It is even feasible to use a peripheral part 15 of thin material. To prevent this from being destroyed during explosive welding, the peripheral part 15 is surrounded by an outer tool 16 acting as support and preventing the peripheral part from being destroyed during explosive welding.

Figure 7:
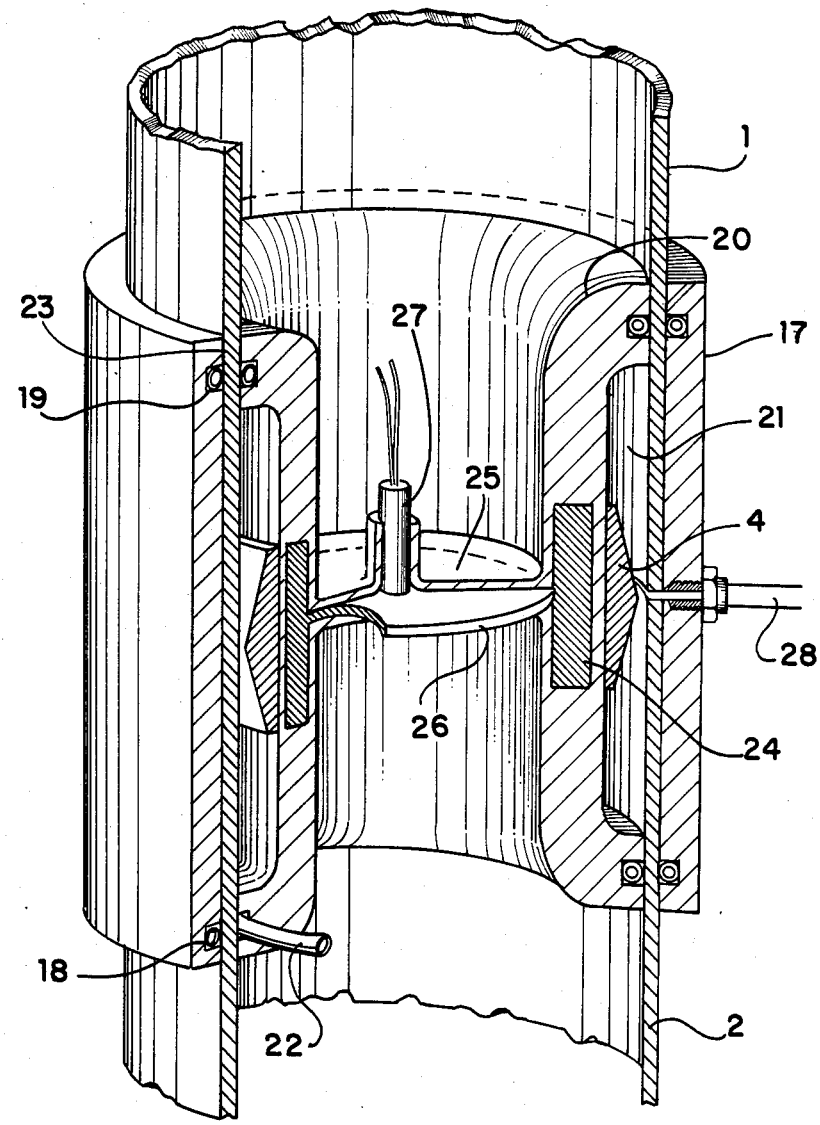
FIG. 7 shows a support means under water prior to detonation of the explosive charge.

FIG. 7 shows a finished joint construction prior to performing explosive welding. The joint is to be produced under water and the joint area must therefore be free from moisture as follows: an outer peripheral part 17 is provided at the surface, close to its outer edges with milled grooves in which sealing rings 18 and 19 are inserted. These may comprise a hose to which compressed air can be supplied, thus producing a good seal between the intermediate part of the inner surface of the peripheral part and the outer surface of the pipes 1 and 2. An annular part 20 of plastic, for instance, is arranged inside the point for joining, said part having U-shaped cross-section. At the outer ends of the annular body, grooves are milled for annular sealing rings 22 and 23, preferably made of hosing which can be supplied with compressed air to ensure satisfactory sealing in the area between the legs of the U-shaped cross-section. The annular body thus includes a circumferential space 21. The inner peripheral part 4 is applied in and under said circumferential space and embedded in the annular part is the annular explosive charge 24. The annular part 20 has a central, disc-shaped part 25 which is preferably made as a unit together with the annular part 20. A disc-shaped initiating charge 26 is embedded or located in the disc and communicates with the explosive charge 24 in exactly the same way as the initiating charge 6 communicates with the explosive charge 5 in FIG. 1.

The disc 25 is provided centrally with a hub in the form of a tube, a detonator 27 being located in said hub.

The joint construction described in FIG. 7 is applied to the pipe ends 1 and 2 as follows: Moisture is evacuated through a conduit 28 from the circumferential space 21, as well as any moisture which may be located between the inner surface of the outer peripheral part and the outer surfaces of pipes 1 and 2. When all moisture has been removed, the initiating charge is initiated by the detonator 7 in the same way as in FIG. 1.

Figure 8:
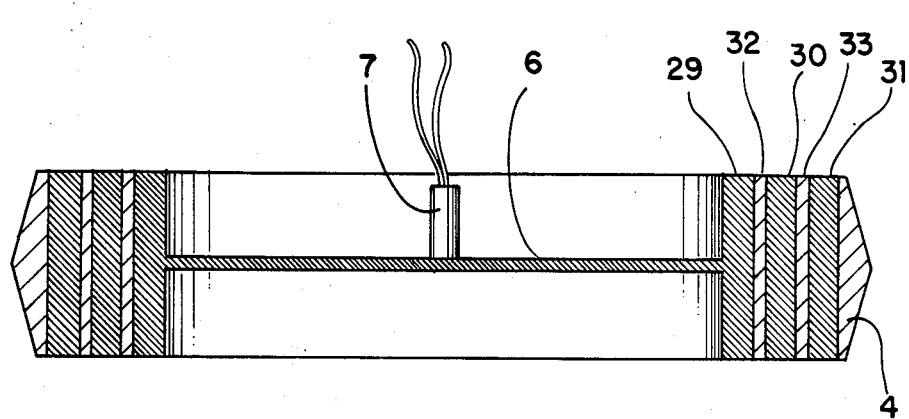
FIG. 8 shows an embodiment of an explosive charge with initiating charge and detonator.

FIG. 8 shows an example of the design of an explosive charge. This is constructed of three annular layers 29,30,31 of explosive matter, and two intermediate, annular layers 32 and 33 made of inert material. It has been found that if 10 mm thick layers of the explosive known as dynamex and 4 mm layers of masonite, a detonation speed of ca. 4500 m/s is obtained.

Figure 9:
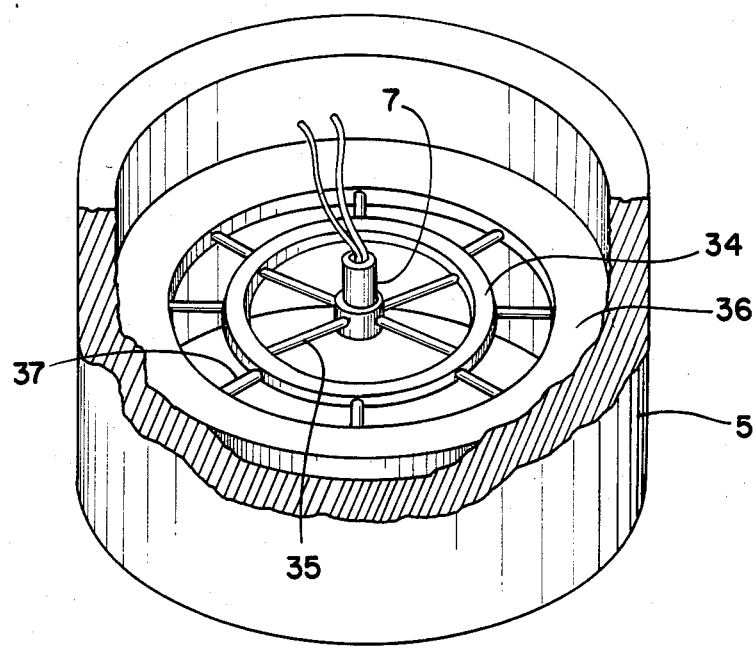
FIG. 9 shows another example of a unit comprising explosive charge, initiating charge and detonator.

FIG. 9, finally, shows an explosive charge 5, annular in shape and enclosing a network of rings 34 and 36 and spokes 35 and 37. This network forms an initiating charge and is initiated by a detonator 7.

To protect the explosive charge 5, initiating charge 6 and detonator 7, it may be advisable to enclose the whole construction in plastic or some other suitable material such as aluminium. The same can be done with the other embodiments.

What is claimed:

1. A compound joint for joining together the abutting ends of two pipes, said joint comprising an outer peripheral part forming a mechanical joint between said pipes, and an inner peripheral part forming a welded joint between said pipes, wherein said welded joint is formed by internally explosion welding said inner peripheral part, and said mechanical joint is formed simultaneously with said welded joint by application of the explosive force of said explosion welding in the radial direction to said outer peripheral part, said outer peripheral part being displacable in the radial direction due to deformation caused by the explosive force, and wherein said outer peripheral part, said inner peripheral part, and an explosive charge internal to said inner peripheral part for causing said explosion welding are formed prior to said explosion welding as a single unit in which said inner part is fixed relative to said outer part by connecting rods.

2. Joint according to claim 1, wherein said pipes comprise metal.

3. Joint according to claim 1, wherein said inner peripheral part comprises metal in the vicinity of said joint.

4. Joint according to claim 1, wherein said outer peripheral part comprises metal in the vicinity of said joint.

5. Joint according to claim 1, wherein said outer peripheral part comprises a tube having substantially the same wall thickness along its entire length.

6. Method of producing a compound joint between the abutting ends of two pipes, comprising the steps of:
 (a) placing partially within the end of one of said pipes, a tubular inner peripheral part having an explosive charge internal to said inner peripheral part;
 (b) placing partially over the end of one of said pipes a tubular outer peripheral part;
 (c) abutting the ends of said pipes such that the abutted ends are between said inner and outer peripheral parts; and
 (d) detonating said explosive charge to weld said inner part to said abutted ends and to cause said abutted ends and said outer part to be displaced outwardly, thereby forming a mechanical joint simultaneously with said weld,
 wherein said outer peripheral part, said inner peripheral part, and said explosive charge are formed as a single unit, in which said inner part is fixed relative to said outer part by connecting rods.

7. Method according to claim 6, wherein said inner peripheral part comprises an annular member with a generally triangular axial cross-section, the apex of said triangular cross-section disposed radially outwardly toward said abutting ends.

8. Method according to claim 6, wherein the distance between the outer surface of said inner peripheral part and the inner surface of said pipes may be varied according to the wall thickness of said inner peripheral part, the distance increasing with increased thickness.

9. Method according to claim 6, wherein said explosive charge comprises a tubular form.

10. Method according to claim 9, wherein said explosive charge comprises at least three concentric tubular layers, in which at least one intermediate layer comprises a non-detonating material.

11. Method according to claim 10, wherein said non-detonating material is selected from the group consisting of cardboard, wood fiber, rubber, salt, and wood.

12. Method according to claim 10, wherein said explosive charge comprises an explosive material located in a plane perpendicular to the axis of said charge and substantially equidistant to the ends of said charge, and a detonator which is located in the center of the plane.

13. Method according to claim 12, wherein said explosive material comprises a disc or strings.

14. Method according to claim 6, wherein prior to sajid detonation, an additional layer is applied between the inner surface of said outer peripheral part and the outer surface of said pipes to be joined.

15. Method according to claim 14, wherein said layer is selected from the group consisting of plastic, metal, rubber, or flexible material.

16. Method according to claim 6, additionally comprising the steps of:
 (a) placing a rigid peripheral ring over said tubular outer peripheral part, prior to detonating said explosive; and
 (b) removing said rigid peripheral ring subsequent to detonating said explosive charge.

17. Method according to claim 16, wherein said rigid peripheral ring comprises two semicircular ring halves having a hinged joint therebetween.

18. Method according to claim 6, wherein the vicinity of said abutted ends is evacuated prior to the step of detonating.

* * * * *